United States Patent
Scott et al.

(10) Patent No.: US 9,970,240 B2
(45) Date of Patent: May 15, 2018

(54) POLYCRYSTALLINE DIAMOND COMPOSITE COMPACT

(71) Applicants: Danny Eugene Scott, Montgomery, TX (US); Jimmy Wayne Eason, The Woodlands, TX (US); David Alexander Curry, The Woodlands, TX (US); Igor Yuri Konyashin, Huenfeld (DE)

(72) Inventors: Danny Eugene Scott, Montgomery, TX (US); Jimmy Wayne Eason, The Woodlands, TX (US); David Alexander Curry, The Woodlands, TX (US); Igor Yuri Konyashin, Huenfeld (DE)

(73) Assignees: Element Six GmbH (IE); Baker Hughes Incorporated, Houston, TX (US)

( * ) Notice: Subject to any disclaimer, the term of this patent is extended or adjusted under 35 U.S.C. 154(b) by 437 days.

(21) Appl. No.: 14/153,428

(22) Filed: Jan. 13, 2014

(65) Prior Publication Data

US 2014/0262533 A1    Sep. 18, 2014

Related U.S. Application Data (63) Continuation of application No. 12/874,470, filed on Sep. 2, 2010.
(Continued)

(51) Int. Cl.
*E21B 10/573*    (2006.01)
*E21B 10/55*    (2006.01)
(Continued)

(52) U.S. Cl.
CPC ............ *E21B 10/573* (2013.01); *B01J 3/062* (2013.01); *B24D 3/10* (2013.01); *B24D 99/005* (2013.01);
(Continued)

(58) Field of Classification Search
CPC ............... E21B 10/567; E21B 10/5673; E21B 10/5676; E21B 10/573; E21B 10/5735;
(Continued)

(56) References Cited

U.S. PATENT DOCUMENTS 3,745,623 A    7/1973    Wentorf, Jr. et al.
4,380,471 A    4/1983    Lee et al.
(Continued)

FOREIGN PATENT DOCUMENTS

WO    2006/032982 A1    3/2006

OTHER PUBLICATIONS

Freinkel, D.M. et al., "Energy Loss Mechanisms in the Erosion of Cemented Tungsten Carbide", Scripta Metallurgica, 1989, 23:659-664.
(Continued)

*Primary Examiner* — Blake E Michener
(74) *Attorney, Agent, or Firm* — Bryan Cave Leighton Paisner LLP (57) ABSTRACT

A polycrystalline diamond (PCD) composite compact element comprising a PCD structure bonded to a cemented carbide substrate, in which at least a peripheral region of the substrate comprises cemented carbide material having a mean free path (MFP) characteristic of at least about 0.1 microns and at most about 0.7 microns; and an elastic limit of at least about 1.9 GPa.

15 Claims, 5 Drawing Sheets

Related U.S. Application Data (60) Provisional application No. 61/241,541, filed on Sep. 11, 2009.

(51) Int. Cl.

| | | |
|---|---|---|
| *E21B 10/46* | (2006.01) | |
| *B01J 3/06* | (2006.01) | |
| *B24D 3/10* | (2006.01) | |
| *C22C 29/08* | (2006.01) | |
| *B24D 99/00* | (2010.01) | |
| *E21B 10/52* | (2006.01) | |
| *B22F 5/00* | (2006.01) | |

(52) U.S. Cl.
CPC ............. *C22C 29/08* (2013.01); *E21B 10/46* (2013.01); *E21B 10/52* (2013.01); *E21B 10/55* (2013.01); *E21B 10/5735* (2013.01); *B01J 2203/062* (2013.01); *B01J 2203/0655* (2013.01); *B01J 2203/0685* (2013.01); *B22F 2005/001* (2013.01); *Y10T 428/25* (2015.01)

(58) Field of Classification Search
CPC .......... E21B 10/52; E21B 10/55; E21B 10/46; B24D 3/10; B24D 99/005; C22C 29/08; B01J 3/062; B01J 2203/0655; B01J 2203/0685; B01J 2203/062; B22F 2005/001
See application file for complete search history.

(56) References Cited

U.S. PATENT DOCUMENTS

| | | | |
|---|---|---|---|
| 5,304,342 A | 4/1994 | Hall, Jr. et al. | |
| 5,431,239 A | 7/1995 | Tibbitts et al. | |
| 5,541,006 A * | 7/1996 | Conley | B22F 7/06 419/12 |
| 5,667,028 A | 9/1997 | Truax et al. | |
| 5,686,119 A * | 11/1997 | McNaughton, Jr. | B22F 3/04 425/130 |
| 6,024,776 A | 2/2000 | Heinrich et al. | |
| 6,196,340 B1 | 3/2001 | Jensen et al. | |
| 6,216,805 B1 | 4/2001 | Lays et al. | |
| 6,258,139 B1 | 7/2001 | Jensen | |
| 7,017,677 B2 | 3/2006 | Keshavan et al. | |
| 7,556,669 B2 | 7/2009 | Ishikawa et al. | |
| 7,972,409 B2 | 7/2011 | Fujino et al. | |
| 2002/0037200 A1 | 3/2002 | Boyce | |
| 2004/0016557 A1 | 1/2004 | Keshavan et al. | |
| 2004/0214050 A1* | 10/2004 | Zackrisson | C22C 29/08 428/698 |
| 2005/0139397 A1 | 6/2005 | Achilles et al. | |
| 2006/0093859 A1 | 5/2006 | Konyashin et al. | |
| 2006/0191723 A1 | 8/2006 | Keshavan | |
| 2007/0056778 A1 | 3/2007 | Webb et al. | |
| 2010/0084196 A1 | 4/2010 | Bertagnolli et al. | |
| 2010/0104861 A1 | 4/2010 | Siddle et al. | |
| 2010/0206640 A1 | 8/2010 | Lockwood et al. | |
| 2010/0225311 A1* | 9/2010 | Bertagnolli | C22C 26/00 324/244 |
| 2010/0300764 A1 | 12/2010 | Naidoo et al. | |
| 2011/0017517 A1 | 1/2011 | Scott et al. | |
| 2011/0024201 A1 | 2/2011 | Scott et al. | |
| 2011/0061944 A1* | 3/2011 | Scott | B01J 3/062 175/428 |
| 2011/0114393 A1* | 5/2011 | Dolan | E21B 10/633 175/428 |
| 2011/0174549 A1* | 7/2011 | Dolan | E21B 10/5676 175/428 |
| 2011/0176879 A1* | 7/2011 | Jonker | B22F 7/062 408/144 |
| 2012/0247028 A1 | 10/2012 | Konyashin et al. | |

OTHER PUBLICATIONS

Roebuck, B., "Magnetic Moment (Saturation) Measurements on Hardmetals", Int. J. Refractory Met., 1996, 14:419-424.
International Search Report for PCT/EP2010/062913 dated Feb. 24, 2011.

* cited by examiner

POLYCRYSTALLINE DIAMOND COMPOSITE COMPACT

This application claims the benefit of U.S. Provisional Application No. 61/241,541, filed Sep. 11, 2009, the disclosure of which is incorporated herein by reference in its entirety.

FIELD

Embodiments of the invention relate to polycrystalline diamond composite compacts, tools incorporating same, and methods for making and using same.

BACKGROUND

Polycrystalline diamond (PCD) is a super-hard, also known as superabrasive material comprising a mass of inter-grown diamond grains and interstices between the diamond grains. PCD may be made by subjecting an aggregated mass of diamond grains to an ultra-high pressure and temperature. A material wholly or partly filling the interstices may be referred to as filler material. PCD may be formed in the presence of a sintering aid such as cobalt, which is capable of promoting the inter-growth of diamond grains. The sintering aid may be referred to as a solvent/catalyst material for diamond, owing to its function of dissolving diamond to some extent and catalyst its re-precipitation. A solvent/catalyst for diamond is understood be a material that is capable of promoting the growth of diamond or the direct diamond-to-diamond inter-growth between diamond grains at a pressure and temperature condition at which diamond is thermodynamically stable. Consequently the interstices within the sintered PCD product may be wholly or partially filled with residual solvent/catalyst material. PCD may be formed on a cobalt-cemented tungsten carbide substrate, which may provide a source of cobalt solvent/catalyst for the PCD.

PCD may be used in a wide variety of tools for cutting, machining, drilling or degrading hard or abrasive materials such as rock, metal, ceramics, composites and wood-containing materials. For example, PCD elements may be used as cutting elements on drill bits used for boring into the earth in the oil and gas drilling industry. In many of these applications the temperature of the PCD material may become elevated as it engages a rock formation, workpiece or body with high energy. Unfortunately, mechanical properties of PCD such as hardness and strength tend to deteriorate at high temperatures, largely as a result of residual solvent/catalyst material dispersed within it.

U.S. Pat. No. 3,745,623 discloses a PCD element comprising a polycrystalline diamond layer bonded to a cemented carbide body comprising 94 weight percent tungsten carbide and 6 weight percent cobalt. U.S. Pat. No. 4,380,471 discloses the various grades of cemented tungsten carbide may be used as substrates for PCD elements, including the following grades from the Carboloy® range: 44A, 90, 883 and 999, which comprise 6, 10, 6 and 3 weight percent cobalt, respectively. U.S. Pat. No. 5,304,342 discusses that for a given application, it is desirable to provide the stiffest possible WC—Co cemented carbide substrate, thereby minimizing the deflection of the PCD layers and reducing the likelihood of PCD failure. However, if the modulus of elasticity is too high, the inserts are prone to break off during drilling.

U.S. Pat. No. 5,667,028 discusses that as a bit rotates, the edge of the PDC cutting layer of a PCD cutter makes contact and "cuts" away at a formation being drilled. At the same time portions of the exposed cutter body also make contact with the formation surface. This contact erodes the cutter body. It discloses an improved polycrystalline diamond composite ("PDC") drag bit cutter comprising multiple cutting surfaces, at least two of which are non-abutting, resulting in an enhanced useful life. Fluid erosion of the PDC cutter may also occur.

U.S. Pat. No. 5,431,239 discloses a composite stud structure having different material characteristics across its structural cross section to provide the abrasion resistance of hard materials combined with fracture resistance, called fracture toughness. In one embodiment a stud is comprised of an inner core of material having higher or enhanced fracture toughness, such as large-grain-size tungsten carbide or high-cobalt-content tungsten carbide, surrounded by an outer layer of hard, abrasion resistant material. A typical material is low-cobalt, cemented tungsten carbide. Although 6% cobalt is possible, about 9-12% cobalt is the range preferred. Cobalt content usually ranges between 6 and 20 percent in cemented tungsten carbides. High cobalt content is greater than about 15%. Carbide grain size and cobalt content can both be varied to design for strength or high fracture toughness. The cutting face is usually manufactured of a superhard material such as polycrystalline diamond.

U.S. Pat. No. 6,216,805 discloses a cutting element that includes a base including an erosion-resistant and abrasion-resistant material. A cutting end of the cutting element is configured to have a superabrasive cutting table secured thereto. In an embodiment, the base is fabricated from an erosion-resistant and abrasion-resistant material. For example, the base may comprise carbide (e.g., tungsten carbide) and a binder material (e.g., cobalt). When relatively more binder is employed to fabricate base, the erosion-resistance and abrasion-resistance of base decrease. Cemented carbide structures that have smaller grains of carbide are also typically more erosion-resistant and abrasion-resistant, but less tough, ductile, and impact-resistant, than cemented carbide structures formed with larger grains of carbide.

U.S. Pat. No. 6,258,139 discloses a PDC (polycrystalline diamond compact) with an internal diamond core in the substrate, to provide additional diamond for exposure when the substrate is sufficiently eroded. Also disclosed is a PDC with an internal carbide core, which is entirely enclosed by the diamond region of the PDC cutter, to avoid high tensile stresses in the diamond region.

Freinkel discloses that WC grain size in the range from 1.6 microns to 2.2 microns results in optimum erosion resistance for cemented WC ("Energy loss mechanisms in the erosion of cemented WC", *Scripta Metallurgica*, 23, 1989, pp. 659-664).

U.S. Pat. No. 7,017,677 discusses that existing substrates for shear cutters are generally formed of cemented tungsten carbide particles with grain sizes in the range of about 1 to 3 microns and cobalt content in the range of about 9 percent to 16 percent by weight, and have hardness in the range of about 86 Ra to 89 Ra.

U.S. Pat. No. 7,556,668 discloses an embodiment of a consolidated hard material made from approximately 75 weight percent hard particles, such as WC, and approximately 25 weight percent binder material, such as Co. Also disclosed are polycrystalline diamond compact (PDC) shear-type cutters wherein hard materials disclosed in the patent may be used to form a shear cutter substrate that is used to carry a layer or "table" of polycrystalline diamond that is formed on it at ultrahigh temperatures and pressures.

There is a need for polycrystalline diamond compact (PDC) cutter elements having improved overall erosion resistance without substantially compromising fracture resistance.

SUMMARY

An embodiment of the invention provides a polycrystalline diamond (PCD) composite compact element comprising a PCD structure bonded to a substrate; wherein at least a peripheral region of the substrate comprises cemented carbide material having a mean free path (MFP) characteristic of at least about 0.1 microns and at most about 0.7 microns, or at most about 0.35 microns; and an elastic limit of at least about 1.9 GPa. In one embodiment of the invention, the peripheral region of the substrate may be adjacent at least an area of an exposed peripheral surface of the substrate.

In some embodiments of the invention, the cemented carbide material may comprise metal carbide particles and metallic binder material; wherein the content of the metallic binder material within at least the peripheral region of the substrate, or throughout substantially the entire substrate, may be at least about 1 weight percent, at least about 3 weight percent, at least about 5 weight percent or at least about 6 weight percent; and at most about 12 weight percent, at most about 11 weight percent or at most about 10 weight percent of the cemented carbide material. In some embodiments, the content of the metallic binder material may be less than 9 weight percent. In one embodiment of the invention, the cemented carbide material may comprise metallic binder in the range from about 8 weight percent to about 13 weight percent of the cemented carbide material.

In some embodiments of the invention, the particles of metal carbide within at least the peripheral region may have a mean size of at least about 0.1 micron, at least about 0.5 micron, at least about 1 micron, at least about 3 microns or at least about 5 microns; and at most about 20 microns, at most about 10 microns, at most about 2 microns or at most about 1 micron. In one embodiment of the invention, the cemented carbide material may comprise metal carbide particles having a mean size in the range from about 1.5 microns to about 3 microns.

In some embodiments of the invention, the metal carbide material may comprise titanium carbide (TiC), tungsten carbide (WC), tantalum carbide (TaC) or other refractory metal carbide. In one embodiment of the invention, the metallic binder material may comprise cobalt (Co), nickel (Ni) or iron (Fe), or an alloy containing Co, Fe or Ni. In some embodiments, the metallic binder material may comprise Co substantially in the face center cubic (fcc) form or substantially in the hexagonal close packed (hcp) crystallographic form.

In one embodiment of the invention, the metallic binder material may contain a low level of carbon and a high level of W. In one embodiment, the metal carbide grains may be substantially rounded WC grains, substantially without sharp facets or edges. In one embodiment of the invention, the metallic binder material may contain a solid solution of tungsten (W) or carbon (C), or both W and C in Co.

In some embodiments of the invention, the metallic binder material may contain particles of chromium carbide ($Cr_3C_2$) or vanadium carbide (VC), or particles of $Cr_3C_2$ and VC dispersed therein, and in some embodiments the combined content of $Cr_3C_2$ and VC particles in the metallic binder material may be less than about 1 weight percent. In one embodiment, the metallic binder material may comprise Co, Ni and $Cr_3C_2$, and in one embodiment, the metallic binder material may comprise Co and $Cr_3C_2$, and may be substantially free of Ni.

In some embodiments of the invention, the metallic binder material may comprise a concentration of a refractory metal such as W, Ti, Ta and Cr in the range from about 5 atomic percent to about 30 atomic percent of the binder material. In one embodiment, the metallic binder material may comprise Co containing a high concentration of W, in the range from about 5 atomic percent to about 30 atomic percent, or in the range from about 10 atomic percent to about 30 atomic percent. In one embodiment, the lattice constant of the Co in the binder material may be about 1% to about 5% greater than that of pure Co (0.3545 nm).

In some embodiments of the invention, metal carbide or metal-containing nano-particles having mean size in the range from about 0.1 nm to about 500 nm, or in the range from about 0.1 nm to about 200 nm may be dispersed in the metallic binder material. The nano-particles dispersed in the metallic binder material may significantly reinforce or strengthen the binder. In some embodiments, the content of the nano-particles in the metallic binder material may be at least 5 volume percent of the metallic binder material. In some embodiments at least the peripheral region of the cemented carbide substrate is substantially free of eta-phase.

In some embodiments of the invention, at least a peripheral region of the cemented carbide substrate, or substantially the entire substrate, may have magnetic coercivity, Hc, of at most about 700 Oe (Oersted), or equivalently about 55.7 kA/m, and at least about 100 Oe, or equivalently about 7.96 kA/m, or at least about 200 Oe, or equivalently about 15.9 kA/m.

In one embodiment of the invention, the metal carbide material may be WC and the content of the metallic binder is in the range from about 1 to about 12 weight percent, or in the range from about 5 to about 11 weight percent; the metallic binder comprising Co; wherein the cemented carbide has a magnetic coercivity up to 17.0 kA/m, up to 9.5 kA/m, up to 8 kA/m, or in the range from 1.6 to 6.4 kA/m; a magnetic moment, σ in units of micro-Tesla times cubic meter per kilogram, respectively, as a function of the Co proportion (X) in weight percent of the cemented carbide in a range of σ=0.11 X to σ=0.137 X.

In some embodiments of the invention, the PCD structure may comprise inter-bonded diamond grains having a mean size of at least about 0.5 micron, at least about 2 microns or at least about 4 microns, and in some embodiments, the PCD structure may comprise inter-bonded diamond grains having a mean size of at most about 20 microns, at most about 15 microns or at most about 10 microns. In one embodiment, the PCD structure may comprise thermally stable PCD material, and may comprise at least a region substantially free of metal solvent/catalyst material. In some embodiments, the PCD structure may be brazed to the substrate, and in one embodiment, the PCD may be integrally formed with and bonded to the substrate.

A method for making a polycrystalline diamond (PCD) composite compact element is provided, the method including providing a cemented carbide substrate comprising particles of a metal carbide and a metallic binder material; wherein the content of the metallic binder may be at least about 1 weight percent, at least about 3 weight percent, at least about 5 weight percent or at least about 6 weight percent; and at most about 12 weight percent, at most about 11 weight percent or at most about 10 weight percent; providing an aggregated mass of diamond particles, the aggregated mass including a solvent/catalyst material for diamond; contacting the aggregated mass with a surface of the substrate to form an unbonded assembly and sintering the unbonded assembly at a pressure and temperature at which diamond is thermodynamically stable to form a PCD structure bonded to a cemented carbide substrate. The temperature may be at least 1,400 degrees centigrade and the pressure may be at least 5.5 GPa. The method is an aspect of the invention. In some embodiments of the invention, the pre-sinter assembly may be subjected to a pressure of at least about 6 GPa, at least about 6.5 GPa, at least about 7 GPa or even at least about 7.5 GPa.

In one version of the method, at least a peripheral region of the substrate may comprise cemented carbide material having a mean free path (MFP) characteristic of at least about 0.1 microns and at most about 0.7 microns, or at most about 0.35 microns; and an elastic limit of at least about 1.9 GPa. In one version, the peripheral region of the substrate may be adjacent at least an area of an exposed peripheral surface of the substrate.

In one version of the method, the method includes providing a cemented carbide substrate in which at least a peripheral region comprises cemented carbide material having a mean free path (MFP) characteristic of at least about 0.1 microns and at most about 0.7 microns, and an elastic limit of at least about 1.9 GPa; the peripheral region comprising particles of a metal carbide and a metallic binder material, the content of the metallic binder being at least about 1 weight percent and at most about 12 weight percent; providing an aggregated mass of diamond particles; introducing a solvent/catalyst material for diamond into the aggregated mass; and sintering the aggregated mass in contact with the substrate at a pressure and temperature at which diamond is thermodynamically stable to form a PCD structure bonded to a cemented carbide substrate.

In some embodiments, the metallic binder may comprise a solvent/catalyst for diamond.

In some embodiments of the method, the solvent/catalyst for diamond may be introduced into the aggregated mass of diamond grains by blending solvent/catalyst material in powder form with the diamond grains, depositing solvent/catalyst material onto surfaces of the diamond grains, or infiltrating solvent/catalyst material into the aggregated mass from a source of the material other than the substrate, either prior to the sintering step or as part of the sintering step.

In one embodiment of the invention, the method may include removing solvent/catalyst material from at least a part of the PCD structure, particularly a part of the PCD structure adjacent a working surface of the PCD composite compact element.

Embodiments of a PCD composite compact element according to the invention may be suitable for an earth boring drill bit, such as a rotary shear-cutting bit for use in the oil and gas drilling industry. The PCD composite compact element may be suitable for a fixed-cutter drill bit, rolling cone, hole opening tool, expandable tool, reamer or other earth boring tools.

An embodiment of the invention provides a tool comprising an embodiment of a PCD composite compact element according to the invention, the tool being for cutting, milling, grinding, drilling, earth boring, rock drilling or other abrasive applications, such as the cutting and machining of metal.

In one embodiment, the tool may comprise a drill bit for earth boring or rock drilling. In one embodiment, the tool may comprise a rotary shear-cutting bit for use in the oil and gas drilling industry. In some embodiments, the tool may be a rolling cone drill bit, a hole-opening tool, an expandable tool, a reamer or other earth boring tools.

DRAWINGS

Non-limiting embodiments of the invention will be described with reference to the accompanying drawings of which.

The references refer to the same respective features in all the drawings.

DETAILED DESCRIPTION OF EMBODIMENTS

As used herein, a "catalyst material for diamond", also referred to as "solvent/catalyst for diamond", is a material that is capable of promoting the nucleation, growth or inter-bonding of diamond grains at a pressure and temperature at which diamond is thermodynamically stable. Catalyst materials for diamond may be metallic, such as cobalt, iron, nickel, manganese and alloys of these, or non-metallic.

As used herein, "polycrystalline diamond" (PCD) material comprises a mass of diamond grains, a substantial portion of which are directly inter-bonded with each other and in which the content of diamond is at least about 80 volume percent of the material. In one embodiment of PCD material, interstices between the diamond gains may be at least partly filled with a binder material comprising a catalyst for diamond. As used herein, "interstices" or "interstitial regions" are regions between the diamond grains of PCD material. In embodiments of PCD material, interstices or interstitial regions may be substantially or partially filled with a material other than diamond, or they may be substantially empty. As used herein, a "filler" material is a material that wholly or partially fills pores, interstices or interstitial regions within a structure, such as a polycrystalline structure. Thermally stable embodiments of PCD material may comprise at least a region from which catalyst material has been removed from the interstices, leaving interstitial voids between the diamond grains. As used herein, a "thermally stable PCD" structure is a PCD structure at least a part of which exhibits no substantial structural degradation or deterioration of hardness or abrasion resistance after exposure to a temperature above about 400 degrees centigrade.

As used herein, the "elastic limit" of a material means the stress at which the strain of the material attains a value of 0.02% under compressive loading.

Figure 1:
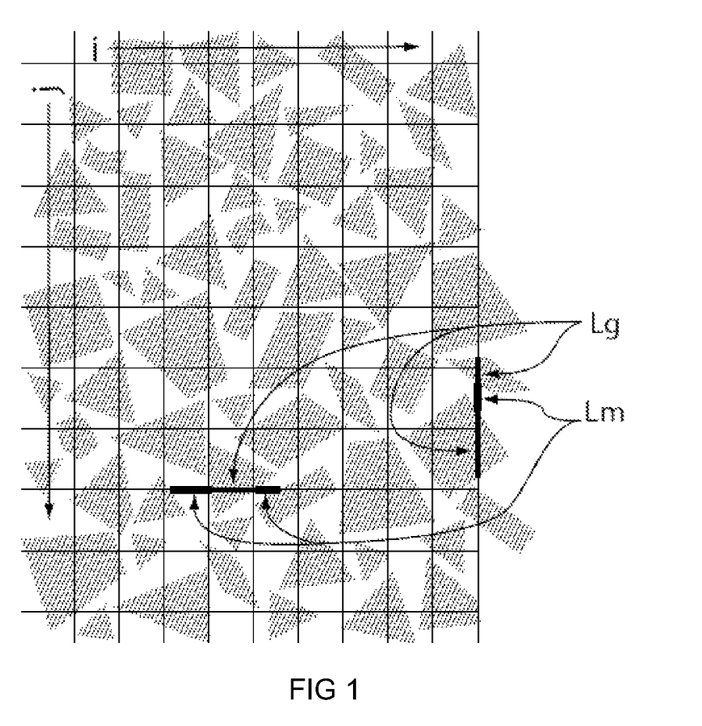
FIG. 1 shows a schematic diagram of a microstructure of cemented carbide.

As used herein, the "mean free path" (MFP) of a composite material such as cemented carbide is a measure of the mean distance between the aggregate carbide grains cemented within the binder material. The mean free path characteristic of a cemented carbide material can be measured using a micrograph of a polished section of the material. For example, the micrograph may have a magnification of about 1500×. With reference to FIG. 1, the MFP can be determined by measuring the distance between each intersection of a line and a grain boundary on a uniform grid. The matrix line segments, Lm, are summed and the grain line segments, Lg, are summed. The mean matrix segment length using both axes is the "mean free path". Mixtures of multiple distributions of tungsten carbide particle sizes can result in a wide distribution of MFP values for the same matrix content.

Figure 2:
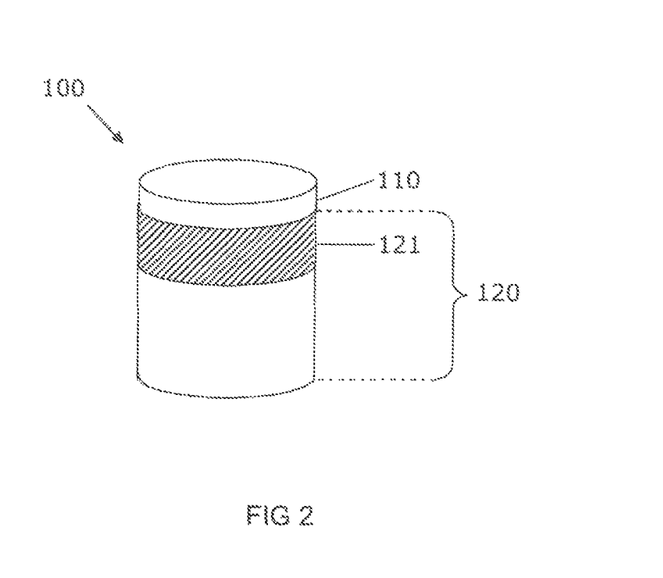
FIG. 2 shows a schematic perspective view of an embodiment of a PCD composite compact element.
Figure 3:
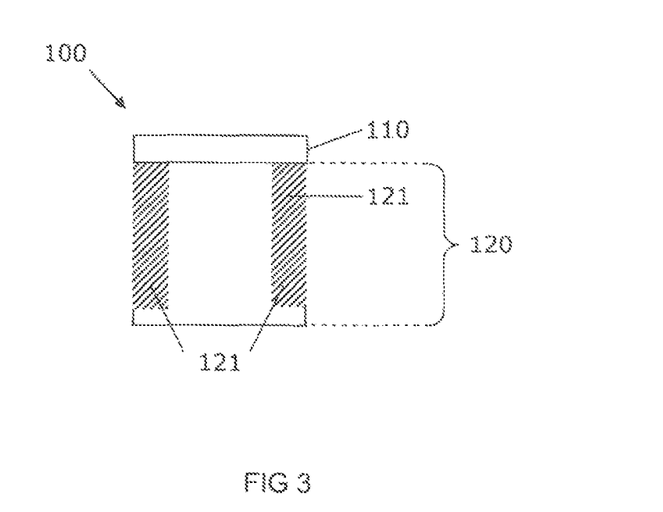
FIG. 3 shows a schematic longitudinal cross-section view of an embodiment of a PCD composite compact element.

With reference to FIG. 2 and FIG. 3, embodiments of PCD composite compact elements 100 may comprise a PCD structure 110 bonded to a cemented carbide substrate 120 comprising particles of a metal carbide and a metallic binder material; wherein at least a peripheral region 121 of the substrate 120 comprises cemented carbide material having a mean free path (MFP) characteristic of at least about 0.1 microns and at most about 0.7 microns, or at most about 0.35 microns; and an elastic limit of at least about 1.9 GPa. In some embodiments, the content of the metallic binder material within a region 121 of the substrate 120 is in the range from about 1 weight percent to about 12 weight percent, and the particles of metal carbide within the region have a mean size in the range from about 0.1 micron to about 20 microns.

Figure 4A:
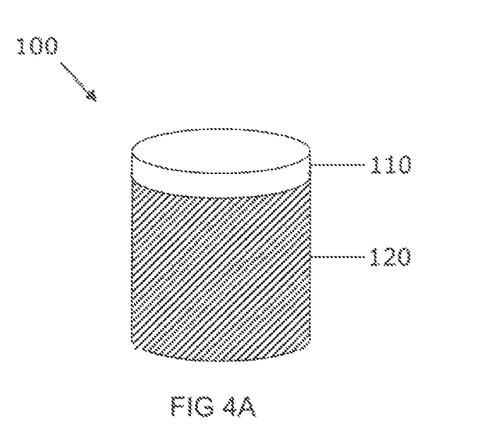
FIG. 4A shows a schematic perspective view and of an embodiment of a PCD composite compact element.
Figure 4B:
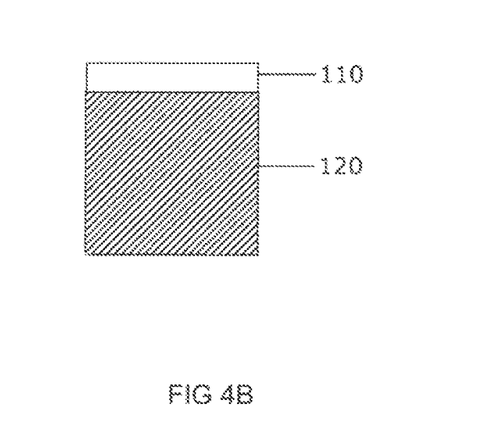
FIG. 4B shows a schematic longitudinal cross-sectional view of the embodiment of a PCD composite compact element shown in FIG. 4A.

With reference to FIG. 4A and FIG. 4B, an embodiment of a PCD composite compact element 100 may comprise a PCD structure 110 bonded to a cemented carbide substrate 120 comprising particles of a metal carbide and a metallic binder material; wherein substantially the entire substrate 120 comprises cemented carbide material having a mean free path (MFP) characteristic of at least about 0.1 microns and at most about 0.7 microns, or at most about 0.35 microns; and an elastic limit of at least about 1.9 GPa.

Figure 5A:
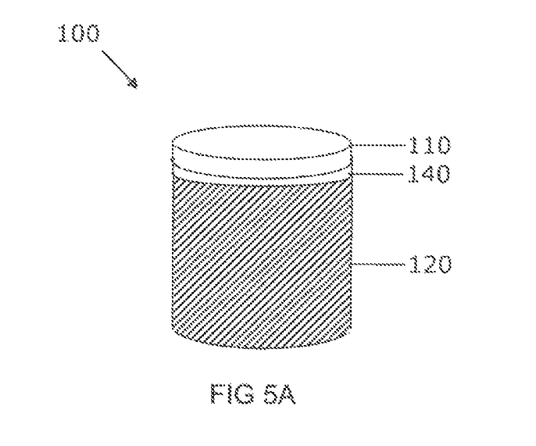
FIG. 5A shows a schematic perspective view of an embodiment of a PCD composite compact element.
Figure 5B:
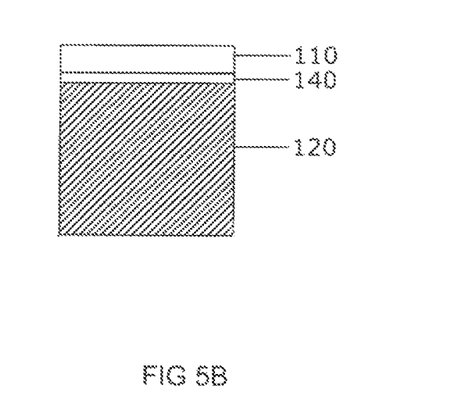
FIG. 5B shows a schematic longitudinal cross-sectional view of the embodiment of a PCD composite compact element shown FIG. 5B.

With reference to FIG. 5A and FIG. 5B, an embodiment of a PCD composite compact element 100 may comprise a PCD structure 110 bonded to a cemented carbide substrate 120 comprising particles of a metal carbide and a metallic binder material; wherein at least a peripheral region of the substrate 120 comprises cemented carbide material having a mean free path (MFP) characteristic of at least about 0.1 microns and at most about 0.7 microns, or at most about 0.35 microns; and an elastic limit of at least about 1.9 GPa; and the PCD structure 110 is bonded to the substrate 120 by means of a braze layer 140.

A desired MFP characteristic can be accomplished several ways known in the art. For example, a lower MFP value may be achieved by using a lower metal binder content. A practical lower limit of about 3 weight percent cobalt applies for cemented carbide and conventional liquid phase sintering. In an embodiment where the cemented carbide substrate is subjected to an ultra-high pressure, for example a pressure greater than about 5 GPa and a high temperature (greater than about 1,400° C. for example), lower contents of metal binder, such as cobalt, may be achieved. For example, where the cobalt content is about 3 weight percent and the mean size of the WC grains is about 0.5 micron, the MFP would be about 0.1 micron, and where the mean size of the WC grains is about 2 microns, the MFP would be about 0.35 microns, and where the mean size of the WC grains is about 3 microns, the MFP would be about 0.7 microns. These mean grain sizes correspond to a single powder class obtained by natural comminution processes that generate a log normal distribution of particles. Higher matrix (binder) contents would result in higher MFP values.

Changing grain size by mixing different powder classes and altering the distributions can achieve a whole spectrum of MFP values depending on the particulars of powder processing and mixing. The exact values would have to be determined empirically.

The magnetic properties of the cemented carbide material can be related to important structural and compositional characteristics. The most common technique for measuring the carbon content in cemented carbides is indirectly, by measuring the concentration of tungsten dissolved in the binder to which it is indirectly proportional: the higher the content of carbon dissolved in the binder the lower the concentration of tungsten dissolved in the binder. The tungsten content within the binder can be determined from a measurement of the magnetic moment, $\sigma$, or magnetic saturation, $M_s = 4\pi\sigma$, these values having an inverse relationship with the tungsten content (Roebuck (1996), "Magnetic moment (saturation) measurements on cemented carbide materials", *Int. J. Refractory Met.*, Vol. 14, pp. 419-424.). The following formula can be used to relate magnetic saturation, Ms, to the concentrations of W and C in the binder:

$$M_s \propto [C]/[W] \times \text{wt. \% Co} \times 201.9 \text{ in units of } \mu T \cdot m^3/kg$$

The binder cobalt content within a cemented carbide material can be measured by various methods well known in the art, including indirect methods such as such as the magnetic properties of the cemented carbide material or more directly by means of energy-dispersive X-ray spectroscopy (EDX), or the most accurate method is based on chemical leaching of Co.

The mean grain size of carbide grains, such as WC grains, can be determined by examination of micrographs obtained using a scanning electron microscope (SEM) or light microscopy images of metallurgically prepared cross-sections of a cemented carbide material body, applying the mean linear intercept technique, for example. Alternatively, the mean size of the WC grains can be measured indirectly by measuring the magnetic coercivity of the cemented carbide material, which indicates the mean free path of Co intermediate the grains, from which the WC grain size may be calculated using a simple formula well known in the art. This formula quantifies the inverse relationship between magnetic coercivity of a Co-cemented WC cemented carbide material and the Co mean free path, and consequently the mean WC grain size. Magnetic coercivity has an inverse relationship with MFP.

An eta-phase composition is understood herein to mean a carbide compound having the general formula $M_xM'_yC_z$, where M is at least one element selected from the group consisting of W, Mo, Ti, Cr, V, Ta, Hf, Zr, and Nb; M' is at least one element selected from the group consisting of Fe, Co, Ni, and C is carbon. Where M is tungsten (W) and M' is cobalt (Co), as is the most typical combination, then eta-phase is understood herein to mean $Co_3W_3C$ (eta-1) or $Co_6W_6C$ (eta-2), as well as fractional sub- and super-stoichiometric variations thereof. There are also some other phases in the W—Co—C system, such as theta-phases $Co_3W_6C_2$, $Co_4W_4C$ and $Co_2W_4C$, as well as kappa-phases $Co_3W_9C_4$ and $CoW_3C$ (these phases are sometimes grouped in the literature within a broader designation of eta-phase).

In some embodiments the cemented carbide substrate is substantially devoid of eta-phase. The absence of eta-phase may be beneficial to the strength and fracture toughness of the substrate.

United States Patent Publication Number 2006/0093859 discloses details of a cemented carbide material comprising tungsten carbide (WC), wherein the content of the metallic binder is in the range from 5 to 25 weight percent, the metallic binder comprising Co; wherein the cemented carbide in at least the region has a magnetic coercive field strength up to 17.0 kA/m, up to 9.5 kA/m, up to 8 kA/m, or in the range from 1.6 to 6.4 kA/m; a magnetic moment, σ in units of micro-Tesla times cubic meter per kilogram, respectively, as a function of the Co proportion (X) in weight percent of the cemented carbide in a range of σ=0.11 X to σ=0.137 X. An example of a cemented carbide material having these properties is available from Element Six Hard Materials GmbH, Germany, under the name of Master Grade™.

The concentration of W in the Co binder depends on the C content. For example, the W concentration at low C contents is significantly higher. The W concentration and the C content within the Co binder of a Co-cemented WC (WC—Co) material can be determined from the value of the magnetic saturation. The magnetic saturation of a hard metal, of which cemented tungsten carbide is an example, is defined as the magnetic moment per unit weight, σ, as well as the induction of saturation per unit weight, 4πσ. The magnetic moment, σ, of pure Co is 16.1 micro-Tesla times cubic meter per kilogram (μT·m³/kg), and the induction of saturation, also referred to as the magnetic saturation, 4πσ, of pure Co is 201.9 μT·m³/kg.

In some embodiments, nano-particles having mean size in the range from about 0.1 nm to about 1 nm and containing cobalt, tungsten and carbon, may be dispersed within the binder. In one embodiment, particles of type one eta phase, $Co_3W_3C$, type two eta phase, $Co_6W_6C$, and theta phase, $Co_2W_4C$, in the fcc crystallographic structure are dispersed in the binder, each having respective mean size of about 0.213 nm, 0.209 nm and 0.215 nm. The presence of these nano-particles can be detected by means of electron diffraction patterns using high resolution transmission electron microscopy (HRTEM). Using dark field HRTEM, the nano-particles can be seen as dark spots. The presence of the nano-particles within the binder may have the effect of reinforcing the binder.

The practical use of cemented carbide grades with substantially lower cobalt content as substrates for PCD inserts is limited by the fact that some of the Co is required to migrate from the substrate into the PCD layer during the sintering process in order to catalyse the formation of the PCD. For this reason, it is more difficult to make PCD on substrate materials comprising lower Co contents, even though this may be desirable.

An embodiment of a PCD composite compact element may be made by a method including providing a cemented carbide substrate, contacting an aggregated, substantially unbonded mass of diamond particles against a surface of the substrate to form an pre-sinter assembly, encapsulating the pre-sinter assembly in a capsule for an ultra-high pressure furnace and subjecting the pre-sinter assembly to a pressure of at least about 5.5 GPa and a temperature of at least about 1,250 degrees centigrade, and sintering the diamond particles to form a PCD composite compact element comprising a PCD structure integrally formed on and joined to the cemented carbide substrate. In some embodiments of the invention, the pre-sinter assembly may be subjected to a pressure of at least about 6 GPa, at least about 6.5 GPa, at least about 7 GPa or even at least about 7.5 GPa.

The hardness of cemented tungsten carbide substrate may be enhanced by subjecting the substrate to an ultra-high pressure and high temperature, particularly at a pressure and temperature at which diamond is thermodynamically stable. The magnitude of the enhancement of the hardness may depend on the pressure and temperature conditions. In particular, the harness enhancement may increase the higher the pressure.

In one embodiment, the substrate may comprise cemented carbide material, which may comprise cemented carbide WC particles having a mean size in the range from about 1.5 micron to about 3 micron and Co binder material, the content of the WC particles being in the range from about 90 weight percent to about 92 weight percent, and the content of the Co being in the range from about 8 weight percent to about 10 weight percent of the cemented carbide material. The cemented carbide material may further comprise particles of $Cr_3C_2$ dispersed in the binder. The content of the $Cr_3C_2$ may be in the range from about 0.1 weight percent and 0.5 weight percent of the cemented carbide material.

In embodiments where the cemented carbide substrate does not contain sufficient solvent/catalyst for diamond, and where the PCD structure is integrally formed onto the substrate during sintering at an ultra-high pressure, solvent/catalyst material may be included or introduced into the aggregated mass of diamond grains from a source of the material other than the cemented carbide substrate. The solvent/catalyst material may comprise cobalt that infiltrates from the substrate in to the aggregated mass of diamond grains just prior to and during the sintering step at an ultra-high pressure. However, in embodiments where the content of cobalt or other solvent/catalyst material in the substrate is low, particularly when it is less than about 11 weight percent of the cemented carbide material, then an alternative source may need to be provided in order to ensure good sintering of the aggregated mass to form PCD.

Solvent/catalyst for diamond may be introduced into the aggregated mass of diamond grains by various methods, including blending solvent/catalyst material in powder form with the diamond grains, depositing solvent/catalyst material onto surfaces of the diamond grains, or infiltrating solvent/catalyst material into the aggregated mass from a source of the material other than the substrate, either prior to the sintering step or as part of the sintering step. Methods of depositing solvent/catalyst for diamond, such as cobalt, onto surfaces of diamond grains are well known in the art, and include chemical vapour deposition (CVD), physical vapour deposition (PVD), sputter coating, electrochemical methods, electroless coating methods and atomic layer deposition (ALD). It will be appreciated that the advantages and disadvantages of each depend on the nature of the sintering aid material and coating structure to be deposited, and on characteristics of the grain.

In one embodiment of a method of the invention, cobalt may be deposited onto surfaces of the diamond grains by first depositing a pre-cursor material and then converting the precursor material to a material that comprises elemental metallic cobalt. For example, in the first step cobalt carbonate may be deposited on the diamond grain surfaces using the following reaction:

$$Co(NO_3)_2 + Na_2CO_3 \rightarrow CoCO_3 + 2NaNO_3$$

The deposition of the carbonate or other precursor for cobalt or other solvent/catalyst for diamond may be achieved by means of a method described in PCT patent publication number WO/2006/032982. The cobalt carbonate may then be converted into cobalt and water, for example, by means of pyrolysis reactions such as the following:

$$CoCO_3 \rightarrow CoO + CO_2$$

$$CoO + H_2 \rightarrow Co + H_2O$$

In another embodiment of the method of the invention, cobalt powder or precursor to cobalt, such as cobalt carbonate, may be blended with the diamond grains. Where a precursor to a solvent/catalyst such as cobalt is used, it may be necessary to heat treat the material in order to effect a reaction to produce the solvent/catalyst material in elemental form before sintering the aggregated mass.

In one embodiment, the cemented carbide substrate may comprise WC particles having mean size of about 1.4 microns, and a Co-based metallic binder content of 13 weight percent, and the metallic binder comprises Co, Ni and $Cr_3C_2$, as a non-limiting example in the weight ratio of about 9.79:2.95:0.30.

In one embodiment, the cemented carbide substrate may comprise WC particles having mean size of about 2.5 microns, and a Co metallic binder content of 9 weight percent.

In one embodiment, the cemented carbide substrate may comprise WC particles having mean size of about 2.5 microns, and a Co metallic binder content of 9 weight percent, and 0.3 weight percent $Cr_3C_2$.

In one embodiment, the cemented carbide substrate may comprise WC particles having mean size of about 0.8 microns, and a Co metallic binder content of 13 weight percent, and 0.4 weight percent VC and 0.5 weight percent $Cr_3C_2$.

In one embodiment, the cemented carbide substrate may comprise WC particles having mean size of about 0.8 microns, and a Co metallic binder content of 10 weight percent, and 0.2 weight percent VC and 0.3 weight percent $Cr_3C_2$.

In one embodiment, the cemented carbide substrate may comprise microwave sintered WC—Co carbide.

Figure 6:
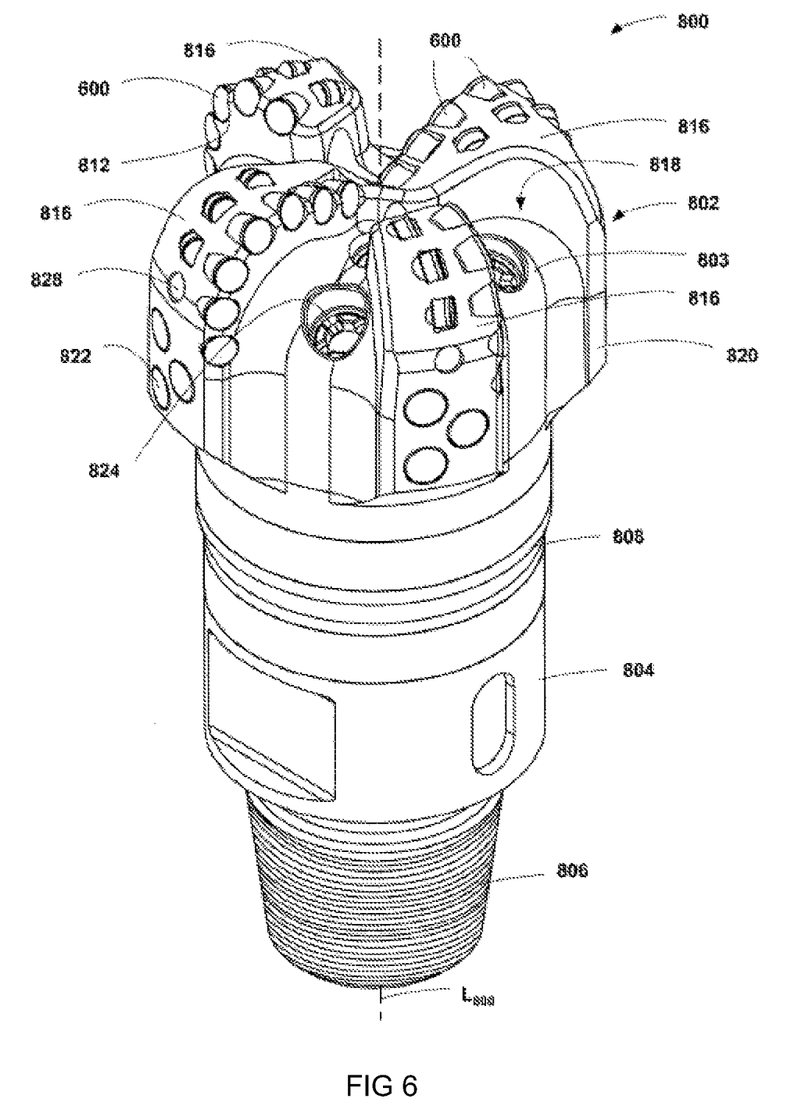
FIG. 6 shows a perspective view of a tool in the form of a rotary earth-boring drill bit bearing PCD elements as cutting elements thereon.

With reference to FIG. 6, an embodiment of an earth-boring rotary drill bit, 800, of the present invention includes, for example, a plurality of cutting elements 600 as previously described herein with reference to FIG. 2, FIG. 3, FIG. 4A, FIG. 4B, FIG. 5A or FIG. 5B. The earth-boring rotary drill bit 800 includes a bit body 802 that is secured to a shank 804 having a threaded connection portion 806 (e.g., a threaded connection portion 806 conforming to industry standards such as those promulgated by the American Petroleum Institute (API)) for attaching the drill bit 800 to a drill string (not shown). The bit body 802 may comprise a particle-matrix composite material or a metal alloy such as steel. The bit body 802 may be secured to the shank 804 by one or more of a threaded connection, a weld, and a braze alloy at the interface between them. In some embodiments, the bit body 802 may be secured to the shank 804 indirectly by way of a metal blank or extension between them, as known in the art.

The bit body 802 may include internal fluid passageways (not shown) that extend between the face 803 of the bit body 802 and a longitudinal bore (not shown), which extends through the shank 804 the extension 808 and partially through the bit body 802. Nozzle inserts 824 also may be provided at the face 803 of the bit body 802 within the internal fluid passageways. The bit body 802 may further include a plurality of blades 816 that are separated by junk slots 818. In some embodiments, the bit body 802 may include gage wear plugs 822 and wear knots 828. A plurality of PDC cutting elements of one or more of embodiments 100, 200, 300 and 400, as previously described herein, which are generally indicated by reference numeral 600 in FIG. 6, may be mounted on the face 803 of the bit body 802 in cutting element pockets 812 that are located along each of the blades 816. In other embodiments, PDC cutting elements 700 as previously described with reference to FIG. 2, FIG. 3, FIG. 4A, FIG. 4B, FIG. 5A or FIG. 5B, or any other embodiment of a PDC cutting element of the present invention may be provided in the cutting element pockets 812.

The cutting elements 600 are positioned to cut a subterranean formation being drilled while the drill bit 800 is rotated under weight on bit (WOB) in a bore hole about centerline L800.

Embodiments of PDC cutting elements of the present invention also may be used as gauge trimmers, and may be used on other types of earth-boring tools. For example, embodiments of cutting elements of the present invention also may be used on cones of roller cone drill bits, on reamers, mills, bi-center bits, eccentric bits, coring bits, and so-called hybrid bits that include both fixed cutters and rolling cutters.

Embodiments of the invention are described in more detail with reference to the examples below, which are not intended to limit the invention.

EXAMPLE 1

A WC—Co substrate was provided, comprising WC grains having mean size of about 2.5 microns and having a binder content of about 9.3 weight percent, this value being made up of about 9 weight percent Co and about 0.3 weight percent $Cr_2C_3$. The substrate was generally cylindrical in shape and had a diameter of about 16 mm and a height of about 13 mm. A layer comprising an aggregated mass of unbonded diamond grains was deposited onto an end surface of the substrate to form an unbonded assembly. The diamond grains had a multimodal size distribution and a mean size of about 7 microns. The unbonded assembly was mounted within a capsule for an ultra-high pressure furnace and the capsule was subjected to an ultra-high pressure in the range from about 5.5 GPa to about 6 GPa and a temperature of about 1,400 degrees centigrade for a period of about 5 minutes to form a sintered PCD composite compact. After sintering, the PCD composite compact was processed to form an insert having a diameter of about 15.9 mm and a PCD structure with thickness in the range of about 1.7 to 2.1 mm.

The mean free path characteristic of the substrate after sintering at the ultra-high pressure was estimated to be in the range of about 0.3 micron to about 0.6 micron and the elastic limit was estimated to be in the range from about 2.0 GPa to about 2.4 GPa. The magnetic coercivity Hc of the substrate was estimated to be in the range from about 110 Oe to about 150 Oe, or equivalently from about 8.7 kA/m to about 11.9 kA/m.

EXAMPLE 2

A wear resistant WC—Co substrate having a Co content of about 6.5 weight percent and low carbon content may be produced according to the teachings of publication number US2006-0093859. The substrate may be generally cylindrical in shape and have a diameter of about 16 mm. The coercive field strength substrate material may be about 7.0 kA/m, the moment of magnetic saturation, σ, may be about 0.8 µT·m³/kg ($M_s$, 4πσ, may be 10.0 µT·m³/kg), the Vickers hardness HV30 may be about 1,100, and the transverse rupture strength may be about 2,400 MPa. The mean size of the WC grains may be about 10 microns. Using an optical microscope, the WC grains may have a rounded appearance. The substrate material may be substantially free of eta-phase. A thin film sample may be produced for examination by TEM (transmission electron microscope). The Co lattice constant may be determined by TEM and X-ray examinations.

The W concentration in the binder of the sample may be in the range from about 18 to about 19 atomic percent, as determined by means of EDX. TEM analysis (transmission electron microscope) of a thin film sample of the substrate material may reveal the presence of nano-grained particles dispersed in the binder. Electron diffraction analysis may reveal that the binder comprises tungsten-containing cubic cobalt matrix having face center cubic (fcc) structure, the lattice constant of which may be about 0.366 nm. The electron diffraction analysis may also reveal that the nano-grained particles have mean size in the range of approximately 3 nm to approximately 10 nm.

A thermally stable PCD disc having diameter of about 16 mm and thickness of about 2.2 mm may be prepared. Raw material diamond powder may be prepared by blending diamond grains from four sources having combined mean grain size of about 7 microns. The blended mix may be formed into an aggregated mass and sintered onto a cobalt-cemented cemented tungsten carbide (WC—Co) substrate at a pressure of about 6.8 GPa and a temperature of about 1,500 degrees centigrade by means of an ultra-high pressure furnace, to form a sintered PCD composite compact.

The composite compact would comprise a layer of PCD integrally bonded onto the substrate. PCD material made as described above would have a diamond content of about 92 percent by volume (±1 percent), the balance being cobalt and minor precipitated phases, the cobalt having infiltrated from the substrate into the aggregated diamond mass during the sintering step. The diamond grains within the PCD cutting structure would have a multimodal size distribution with a mean size of about 11 microns (±5.5 percent), expressed in terms of equivalent circle diameter. Grain intergrowth and contact can be expressed in terms of diamond grain contiguity, and the mean contiguity of the PCD would be 62.0 percent (±1.9 percent). The interstitial mean free path of the PCD would be about 0.7 (±0.6) microns.

The cemented carbide substrate may then removed from the composite compact by grinding, leaving an un-backed, free-standing PCD disc. The PCD disc may be ground to a thickness of about 2.2 microns and then treated (leached) in acid to remove substantially all of the cobalt solvent/catalyst material throughout the entire PCD cutting structure.

A foil of active braze material having thickness of about 80 microns and diameter of about 16 mm may be sandwiched each PCD segment and an end surface of the wear resistant substrate. The braze material comprised by weight 63.00% Ag, 32.25% Cu and 1.75% Ti, and is available under the trade name of Cusil AB™. Prior to brazing, the PCD segments may be ultrasonically cleaned and both the tungsten carbide substrate and the braze foil were slightly ground and then ultrasonically cleaned. The pre-compact element assembly may be subjected to heat treatment in a vacuum. The temperature may be increased to 920 degrees centigrade over 15 minutes, held at this level for 5 minutes and then reduced to ambient temperature over about 8 to 9 hours. A vacuum of at least $10^{-5}$ millibar may be maintained during the heat treatment. Care should be taken to avoid or minimise the amount of oxygen and other impurities in the furnace environment.

EXAMPLE 3

A wear resistant WC—Co substrate having a Co content of about 6.5 weight percent and comprising WC grains having mean size of about 8 microns may be provided. The substrate may be generally cylindrical in shape and have a diameter of about 16 mm. The coercive field strength may be about 6.4 kA/m, the moment of magnetic saturation, σ, may be about 0.95 µT·m³/kg ($M_s$, 4πσ, may be about 11.9 µT·m³/kg), the Vickers HV30 hardness may be about 1,140, and the transverse rupture strength may be about 1,950 MPa.

A plurality of diamond grains having multimodal size distribution and mean size of about 7 microns may be blended with 5 weight percent cobalt powder. The blended mix may be formed into an unbonded aggregated mass in layer form against the upper surface of the substrate to form an unbonded assembly, which may then mounted within a capsule for an ultra-high pressure furnace. The capsule may be subjected to a pressure of about 5.5 GPa and a temperature of about 1,400° C. for a period of about 5 minutes. After sintering, the first and second substrate elements may be sintered together and the PCD composite compact may be processed to form an insert having a diameter of about 15.9 mm and a PCD structure with thickness in the range of about 1.7 to 2.1 mm.

Embodiments of the invention may exhibit enhanced erosion resistance and sufficient fracture resistance and extended working life potential.

Embodiments comprising a substrate having magnetic properties according to the invention may have enhanced fracture resistance and high wear resistance. While wishing not to be bound by a particular theory, micro-structural features underlying these magnetic properties may include the amounts of tungsten and carbon dissolved in the metallic binder, and nano-grained particles dispersed within the binder, the particles comprising W, C and Co (so-called eta- or theta-phases).

Embodiments of the invention may have the advantage that key properties of the cemented carbide, such as erosion resistance or fracture toughness are not deleteriously affected by subjecting it to an ultra-high pressure and temperature at which diamond is thermodynamically stable.

Embodiments of the invention may have the advantage that the absence of eta-phase therein may be beneficial to the strength and fracture toughness of the substrate.

Embodiments of the invention may have the advantage of comprising a binder material having enhanced strength. While wishing not to be bound by a particular theory, high levels of dissolved W or other refractory metal such as Ti or Ta in the binder may strengthen the binder. Dissolved W or even other refractory metal such as Ti or Ta in the binder may have the effect of increasing the lattice constant of the binder. Embodiments of the invention may have the advantage that they comprise cobalt binder material having enhanced erosion resistance and strength.

While wishing not to be bound by a particular theory, dissolved W or even of other refractory metal such as Ti or Ta in cobalt metallic binder may stabilise the fcc form of cobalt against conversion to the hcp form, which may have the effect of improving the strength and erosion resistance of the cobalt binder.

While wishing not to be bound by a particular theory, particles of $Cr_3C_2$ dispersed in the metallic binder may increase the yield strength and elastic limit of the cemented carbide and inhibit the transformation from the fcc form of Co to the hcp form, which may improve erosion resistance.

Embodiments of the invention may have the advantage of comprising a substrate with enhanced erosion resistance bonded to a well sintered PCD structure with high diamond grain contiguity.

Embodiments of the invention may exhibit enhanced erosion resistance of the substrates in combination with sufficient fracture resistance.

Although the foregoing description of consolidated hard materials, production methods, and various applications of them contain many specifics, these should not be construed as limiting the scope of the present invention, but merely as providing illustrations of some embodiments. Similarly, other embodiments of the invention may be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced.

The invention claimed is:

1. A polycrystalline diamond (PCD) composite compact element comprising a PCD structure bonded to a cemented carbide substrate, in which only a peripheral region of the substrate comprises cemented carbide material having a mean free path (MFP) characteristic of at least about 0.1 microns and at most about 0.7 microns; and an elastic limit of at least about 1.9 GPa, wherein the cemented carbide material of the peripheral region comprises metal carbide particles and metallic binder material; the content of the metallic binder material of the peripheral region being at least about 1 weight percent and at most 12 weight percent.

2. A PCD composite compact element according to claim 1, wherein the metal carbide particles within the peripheral region have a mean size of at least about 0.1 micron and at most about 20 microns.

3. A PCD composite compact element according to claim 1, wherein the peripheral region has magnetic coercivity of at least about 100 Oe and at most about 700 Oe.

4. A PCD composite compact element according to claim 1, wherein the metallic binder material comprises cobalt and the metal carbide is tungsten carbide.

5. A PCD composite compact element according to claim 1, wherein the metallic binder material contains a solid solution of at least one of tungsten and carbon in cobalt.

6. A PCD composite compact element according to claim 1, wherein the metal carbide particles comprise grains of at least one of chromium carbide and vanadium carbide, said grains being dispersed in the metallic binder material.

7. A PCD composite compact element according to claim 1, wherein the metallic binder material comprises cobalt, and nickel and $Cr_3C_2$.

8. A PCD composite compact element according to claim 1, wherein the metal carbide is TiC, WC, or TaC.

9. A PCD composite compact element according to claim 1, wherein the metal carbide is tungsten carbide (WC), and the metallic binder comprises cobalt; and the cemented carbide material of the peripheral region has a magnetic coercive field strength up to about 17.0 kA/m and a magnetic moment, σ in units of micro-Tesla times cubic meter per kilogram, in a range of σ=0.11 X to σ=0.137 X, where X is the Co proportion in weight percent in the cemented carbide material.

10. A PCD composite compact element according to claim 1, wherein the cemented carbide of the peripheral region is substantially free of eta-phase.

11. A PCD composite compact element according to claim 1, wherein said metal carbide particles or metal-containing nano-particles having mean size in the range from about 0.1 nm to about 500 nm are dispersed in the metallic binder material.

12. A method for making a PCD composite compact element, the method including providing a cemented carbide substrate in which only a peripheral region comprises cemented carbide material having a mean free path (MFP) characteristic of at least about 0.1 microns and at most about 0.7 microns, and an elastic limit of at least about 1.9 GPa; the cemented carbide material in the peripheral region comprising particles of a metal carbide and a metallic binder material, the content of the metallic binder being at least about 1 weight percent and at most about 12 weight percent; providing an aggregated mass of diamond particles; introducing a solvent/catalyst material for diamond into the aggregated mass; and sintering the aggregated mass in contact with the substrate at a pressure and temperature at which diamond is thermodynamically stable to form a PCD structure bonded to a cemented carbide substrate; wherein the step of introducing the solvent/catalyst for diamond into the aggregated mass of diamond particles comprises introducing by at least one of blending solvent/catalyst material in powder form with the diamond particles, depositing solvent/catalyst material onto surfaces of the diamond particles, and infiltrating solvent/catalyst material into the aggregated mass from a source of the material other than the substrate.

13. A tool comprising a PCD composite compact element according to claim 1, the tool being for cutting, milling, grinding, drilling, earth boring, rock drilling applications.

14. A tool according to claim 13, wherein the tool comprises a drill bit for earth boring or rock drilling.

15. A tool according to claim 14, wherein the tool comprises a rotary fixed-cutter bit for use in the oil and gas drilling industry.

* * * * *